United States Patent [19]

Ryu et al.

[11] Patent Number: 4,627,072
[45] Date of Patent: Dec. 2, 1986

[54] EQUALIZER MODIFYING A PHASE OF A GAIN CONTROL SIGNAL TO CARRY OUT EQUALIZATION

[75] Inventors: Toshihiko Ryu; Shoichi Mizoguchi, both of Tokyo, Japan

[73] Assignee: NEC Corporation, Tokyo, Japan

[21] Appl. No.: 619,426

[22] Filed: Jun. 11, 1984

[30] Foreign Application Priority Data

Jun. 10, 1983 [JP] Japan ................................ 58-103810

[51] Int. Cl.$^4$ ............................................. H03H 7/30
[52] U.S. Cl. ...................................... 375/14; 333/18; 364/724
[58] Field of Search ........................ 375/11, 12, 13, 14, 375/15; 338/18, 28 R; 364/724; 178/63 E, 69 M, 69 B

[56] References Cited

U.S. PATENT DOCUMENTS

| Re. 31,351 | 8/1983 | Falconer | 375/12 |
| 3,651,316 | 3/1972 | Gibson | 375/14 |
| 3,750,026 | 7/1973 | Watanabe | 333/18 |
| 3,755,736 | 8/1973 | Kaneko et al. | 375/12 |
| 3,909,752 | 9/1975 | Stuart | 333/18 |
| 4,453,256 | 6/1984 | Ryu | 375/15 |
| 4,456,893 | 6/1984 | Otani | 375/12 |
| 4,567,599 | 1/1986 | Mizoguchi | 375/14 |

Primary Examiner—Robert L. Griffin
Assistant Examiner—Stephen Chin
Attorney, Agent, or Firm—Sughrue, Mion, Zinn, Macpeak, and Seas

[57] ABSTRACT

In an equalizer for equalizing, by the use of zero forcing algorithm, an input signal obtained by modulating a carrier wave of a carrier frequency at a modulation rate, a specific one of complex control signals is modified into a modified complex signal and supplied to a specific one of gain control circuits of a transversal filter corresponding to a specific one of additional taps except a central tap. The modified complex signal is produced by rotating a phase of the specific complex control signal by a step equal to an integral multiple of $\pi/2$. Specifically, at least one of real and imaginary parts of the modified complex signal is inverted relative to those of the specific complex control signal. The real and the imaginary parts of the modified control signal are delivered to in-phase and quadrature portions of the specific gain control circuit in consideration of the step.

16 Claims, 8 Drawing Figures

EQUALIZER MODIFYING A PHASE OF A GAIN CONTROL SIGNAL TO CARRY OUT EQUALIZATION

BACKGROUND OF THE INVENTION

This invention relates to an equalizer for use in equalizing an input signal of an intermediate frequency band in a digital radio transmission system.

In general, an equalizer of the type described is supplied through a transmission path with an input signal subjected to modulation at a modulation rate. The modulation may be, for example, quadrature amplitude modulation. Degradation of a characteristic in the transmission path and interruption in the transmission path give rise to a distortion of a waveform of the input signal. The equalizer serves to equalize the distortion of the waveform, as well known in the art.

A conventional transversal equalizer comprises a transversal filter having a central tap, a plurality of taps on both sides of the central tap, and a plurality of delay units which are connected between two adjacent ones of the taps and each of which provides a predetermined delay which is substantially equal to a reciprocal of the modulation rate. The input signal is derived from the central tap and the other taps as a central tap signal and additional tap signals, respectively. The central and the additional tap signals are multiplied by a central control signal and complex control signals supplied from a control signal circuit and are sent as gain controlled signals to a pair of adder circuits. Anyway, equalization of the input signal is carried out in the transversal filter and an equalized signal is produced as a filter output signal.

In order to produce the central and the complex control signals, zero forcing algorithm is often used in the transversal equalizer. With the zero forcing algorithm, each of the additional tap signals should fall within a predetermined range relative to the central tap signal on a vector plane. The predetermined range is, for example, between minus $\pi/2$ and plus $\pi/2$, both exclusive. Otherwise, the transversal equalizer can never carry out desired operation.

Phases of the other tap signals are often located outside of the predetermined range in dependency on a relationship between a carrier frequency of the input signal and the predetermined delay.

In another conventional transversal equalizer proposed in U.S. Pat. No. 4,453,256 issued to T. Ryu and assigned to the instant assignee, supplementary delay lines are added to a transversal filter to give supplementary delays to a preselected one of the additional tap signals and to a preselected one of the gain controlled signals. With this structure, it is possible to locate each phase of the preselected tap signal and the preselected gain controlled signal within the predetermined range.

The proposed equalizer, however, becomes intricate in structure because superfluous supplementary delay lines are added to the equalizer. In addition, inasmuch as each length of the supplementary delay lines should precisely be controlled or adjusted in order to locate each phase within the predetermined range. Such adjustment of each length requires much labor and time.

SUMMARY OF THE INVENTION

It is an object of this invention to provide an equalizer which is simple in structure.

It is another object of this invention to provide an equalizer of the type described, wherein equalization is carried out by the use of zero forcing algorithm without any superfluous circuitry.

An equalizer to which this invention is applicable is responsive to an input signal subjected to modulation at a modulation rate for producing an output signal. The input signal is accompanied by a carrier wave of a carrier frequency. The equalizer includes delay means responsive to the input signal for successively delaying the input signal in relation to the modulation rate to produce a central tap signal and additional tap signals, control signal generating means for generating a central control signal and complex control signals which are in one-to-one correspondence to the central and the additional tap signals, respectively, and output signal producing means responsive to the central and the additional tap signals and to the central control signal for producing the output signal. The complex control signals have different phases relative to the central control signal. According to this invention, the equalizer comprises phase modifying means for modifying a specific phase of one of the complex control signals into a modified phase in consideration of the modulation rate and the carrier frequency.

DESCRIPTION OF THE PREFERRED EMBODIMENT

Figure 1:
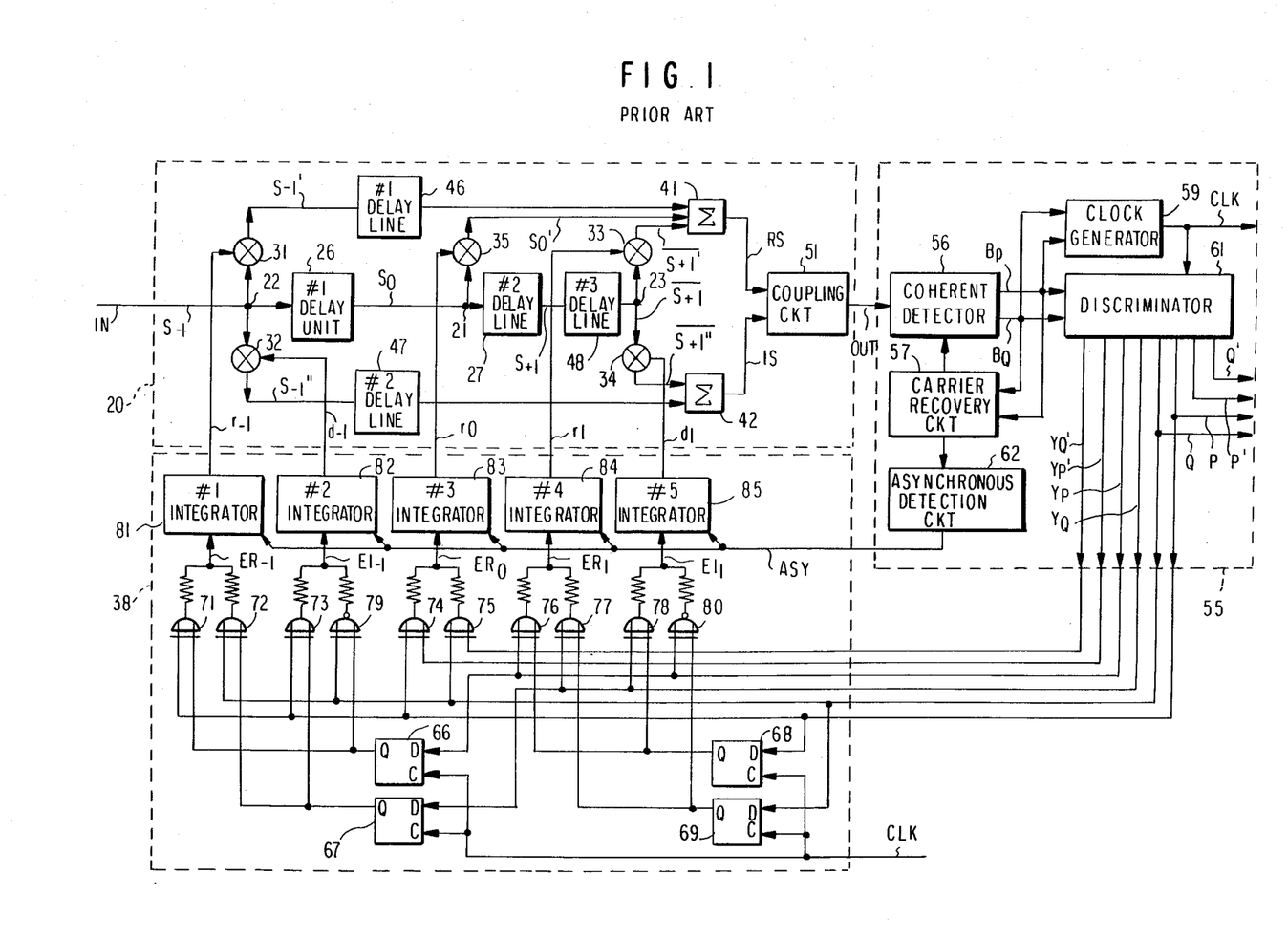
FIG. 1 shows a block diagram of a conventional equalizer.

Referring to FIG. 1, a conventional equalizer will be described for a better understanding of this invention. The illustrated equalizer is supplied with an input signal IN of an intermediate frequency band. The input signal IN is assumed to be subjected to quadrature amplitude modulation at a predetermined modulation rate. Thus, the input signal is accompanied by a carrier wave of a preselected frequency modulated at the predetermined modulation rate.

The equalizer comprises a transversal filter 20 responsive to the input signal IN for producing an output signal OUT which is also subjected to quadrature amplitude modulation like the input signal but which is equalized by the transversal filter 20. The illustrated transversal filter 20 has three taps. A central one of the three taps may be called a central or a first tap 21. The remaining ones of the taps are depicted on the lefthand and the righthand sides of the central tap 21 and may be called second and third taps 22 and 23, respectively. The second and the third taps 22 and 23 may often be referred to as first and second additional taps.

First and second delay units 26 and 27 are placed between the second and the first taps 22 and 21 and between the first and the third taps 21 and 23, respectively. Each of the first and the second delay units 26 and 27 provides a delay which is substantially equal to a reciprocal of the modulation rate. As a result, the input signal IN is given to the second tap 22 as a first one of additional tap signals and successively delayed by the first and the second delay units 26 and 27 to be sent as a central tap signal and a second additional tap signal through the first and the third taps 21 and 23, respectively.

Let the second, the first, and the third taps 22, 21, and 23 be specified by consecutive numbers of (−1), O, and (+1), respectively, taking the successive delays into consideration. In this connection, the first additional tap signal appearing at the (−1) tap 22 may be specified by $S_{-1}$. Likewise, the central and the second additional tap signals may be specified by $S_0$ and $S_{+1}$, respectively.

Inasmuch as the input signal IN is subjected to the quadrature amplitude modulation, as mentioned before, the input signal IN includes an in-phase component and a quadrature phase component. The in-phase and the quadrature phase components are individually processed with reference to the central tap signal $S_0$. More specifically, the first additional tap signal $S_{-1}$ is delivered to a first in-phase multiplier 31 and a first quadrature multiplier 32. The second additional tap signal $S_{+1}$ is delivered to a second in-phase multiplier 33 and a second quadrature multiplier 34 in a manner to be described later. The central tap signal $S_0$ is given to a central in-phase multiplier 35 alone because no quadrature phase component includes the central tap signal $S_0$. Each of the multipliers 31 to 35 may be referred to as a gain control circuit.

A central control signal $C_0$ and first and second complex control signal $C_{-1}$ and $C_{+1}$ are produced by a control signal generating circuit 38 as will later be described in detail. The central control signal $C_0$ consists of a real part alone and is therefore represented by $r_0$ in FIG. 1. On the other hand, each of the first and the second complex signals $C_{-1}$ and $C_{+1}$ consists of a real part and an imaginary part represented by r and d, respectively. In FIG. 1, the first complex control signal $C_{-1}$ is specified by a combination of $r_{31\ 1}$ and $d_{-1}$ while the second complex control signal $C_{+1}$, a combination of $r_1$ and $d_1$.

As shown in FIG. 1, the real and the imaginary parts $r_{-1}$ and $d_{-1}$ of the first complex control signal $C_{-1}$ are delivered from the control signal generating circuit 38 to the first in-phase and the first quadrature multipliers 31 and 32, respectively. Likewise, the real and the imaginary parts $r_1$ and $d_1$ of the second complex control signal $C_{+1}$ are delivered to the second in-phase and the second quadrature multipliers 33 and 34, respectively. The central control signal $C_0$ or $r_0$ is sent to the central in-phase multiplier 35 in a usual manner.

The first in-phase and the first quadrature multipliers 31 and 32 supply first and second adders 41 and 42 with a first controlled in-phase component $S_{-1}'$ and a first controlled quadrature component $S_{-1}''$ through first and second additional delay lines 46 and 47, respectively. The first and the second additional delay lines 46 and 47 will later be described.

The second in-phase and the second quadrature multipliers 33 and 34 supply the first and the second adders 41 and 42 with a second controlled in-phase component and a second controlled quadrature component which are represented by $\overline{S}_{+1}'$ and $\overline{S}_{+1}''$, respectively. Each of the first and the second in-phase components may be named a first controlled signal while each of the first and the second quadrature components is named a second controlled signal. A central controlled in-phase component $S_0'$ is sent from the central in-phase multiplier 35 to the first adder 41 alone.

It should be noted here that the third tap signal $S_{+1}$ is given through a third additional delay line 48 to the second in-phase and the second quadrature multipliers 33 and 34, as will later be described together with the first and the second additional delay lines 46 and 47.

The first and the second adder circuits 41 and 42 carry out additions to produce an in-phase signal RS and a quadrature signal IS representative of results of the additions, respectively. The in-phase and the quadrature signals RS and IS may be called first and second processed signals, respectively. In this connection, the first and the second adders 41 and 42 may be referred to as first and second processing circuits, respectively. The in-phase and the quadrature signals RS and IS are combined together by a coupling circuit 51 with a quadrature phase kept between the in-phase and the quadrature signals RS and IS. This means that operation of the coupling circuit 51 is specified by:

$$RS+jIS,$$

where j represents the imaginary unit. A coupled signal is sent as the output signal OUT to a demodulator 55.

The first and the second adders 41 and 42 and the coupling circuit 51 will be called an output signal producing circuit, together with the multipliers 31 through 35.

The demodulator 55 comprises a coherent detector 56 responsive to the output signal OUT and to a recovered carrier wave supplied from a carrier recovery circuit 57. The coherent detector 56 carries out coherent detection with reference to the recovered carrier wave to produce first and second sequences $B_P$ and $B_Q$ of baseband signals. Responsive to the first and the second sequences $B_P$ and $B_Q$, a clock generator 59 delivers a sequence of clock pulses CLK to both of the control signal generating circuit 38 and a discriminator 61. The discriminator 61 produces first through fourth demodulated digital signals represented by P, Q, P′, and Q′. The discriminator 61 also produces first through fourth digital error signals which correspond to the demodulated digital signals P, Q, P′, and Q′, respectively, and which are therefore represented by $Y_P$, $Y_Q$, $Y_{P'}$, and $Y_{Q'}$, respectively. Such a discriminator 61 may be a decision circuit illustrated in the above-referenced United States patent and will therefore not be described any longer.

In addition, the carrier recovery circuit 57 produces the recovered carrier wave in response to the first and the second sequences $B_P$ and $B_Q$ of the baseband signals. The carrier recovery circuit 57 is coupled to an asynchronous detection circuit 62. The asynchronous detection circuit 62 monitors the carrier recovery circuit 57 to detect an asynchronous state of the equalizer and to produce an asynchronous state signal ASY representative of the asynchronous state when the asynchronous detection circuit 62 detects the asynchronous state.

The first through the fourth digital error signals $Y_P$, $Y_Q$, $Y_{P'}$, and $Y_{Q'}$ and the first and the second demodulated digital signals P and Q are delivered from the discriminator 61 to the control signal generating circuit 38 together with the clock pulse sequence CLK and the asynchronous state signal ASY.

As mentioned in the above-referenced United States patent, a combination of the digital error signals $Y_P$ and $Y_Q$ and the demodulated digital signals P and Q serves to produce the first and the second complex control signals $C_{-1}$ and $C_{+1}$ while a combination of the remaining digital error signals $Y_{P'}$ and $Y_{Q'}$ and the demodulated digital signals P and Q, the central control signal $C_0$. In order to produce the central control signal $C_0$ and the first and the second complex signals $C_{-1}$ and $C_{+1}$, the illustrated control signal generating circuit 38 comprises first through fourth flip flops 66 to 69, first through eighth Exclusive OR gates 71 to 78 and first and second Exclusive NOR gates 79 and 80. The Exclusive OR and NOR gates 71 to 80 are coupled through resistors (unnumbered) to first through fifth resettable integrators 81 to 85 in pairs. More particularly, the first and the second demodulated digital signals P and Q are delivered to the third and the fourth flip flops 68 and 69, respectively. The first demodulated digital signal P is sent to the first, the third and the fourth Exclusive OR gates 71, 73, and 74 while the second demodulated digital signal Q is sent to the second and the fifth Exclusive OR gates 72 and 75 and the first Exclusive NOR gate 79. The first and the second digital error signals $Y_P$ and $Y_Q$ are delivered to the first and the second flip flops 66 and 67, respectively. The first digital error signal $Y_Q$ is sent to the seventh and the eighth Exclusive OR gates 77 and 78 while the second digital error signal $Y_P$, the sixth Exclusive OR gate 76 and the second Exclusive NOR gate 80. The third and the fourth digital error signals $Y_{P'}$ and $Y_{Q'}$ are given to the fourth and the fifth Exclusive OR gates 74 and 75, respectively.

Furthermore, the first flip flop 66 is connected to the first Exclusive OR and the Exclusive NOR gates 71 and 79 while the second flip flop 67, the second and the third Exclusive OR gates 72 and 73. The third flip flop 68 is connected to the sixth and the eighth Exclusive OR gates 76 and 78 while the fourth flip flop 69, the seventh Exclusive OR gate 77 and the second Exclusive NOR gate 80. Each of the Exclusive OR and the Exclusive NOR gates will be called an Exclusive logic circuit. Anyway, a set of logic signals is produced from the first and the second flip flop pair and the third and the fourth flip flop pair to produce the first and the second complex control signals $C_{-1}$ and $C_{+1}$.

First through fifth intermediate control signals $ER_{-1}$, $EI_{-1}$, $ER_0$, $ER_1$, and $EI_1$ are sent from the respective pairs of the Exclusive logic circuits 71 to 80 to the first through the fifth resettable integrators 81 to 85 in a manner described in the above-mentioned United States patent. The first through the fifth resettable integrators 81 to 85 are coupled to the asynchronous detection circuit 62. When the asynchronous state signal ASY is given from the asynchronous detection circuit 62 to the first through the fifth resettable integrators 81 to 85, the third resettable integrator 83 is kept at, namely, reset into a logic "1" level while each of the remaining integrators 81, 82, 84, and 85 is reset into a logic "0" level. In the absence of the asynchronous state signal ASY, each integrator 81 to 85 works out a time average of each intermediate control signal to remove an unnecessary noise component. Anyway, the first through the fifth resettable integrators 81 to 85 produce the first complex control signal $C_{-1}$, the central control signal $C_0$, and the second complex control signal $C_{+1}$.

It will be understood that the central control signal $C_0$ and the first and the second complex control signals $C_{-1}$ and $C_{+1}$ are determined by the zero forcing algorithm.

Operation of the control signal generating circuit 38 is similar to that described in the above-mentioned United States patent and will not be described any longer.

In FIG. 1, it should be understood that each delay of the first and the second delay units 26 and 27 is substantially equal to the reciprocal of the modulation rate. Preferably, the carrier wave of each of the input signal IN and the tap signals is rotated by a phase equal to an integral multiple of $2\pi$ (rad) in each of the first and the second delay units 26 and 27. In other words, it is preferable that the carrier frequency is equal to an integral multiple of the modulation rate. However, the carrier frequency is not always equal to the integral multiple of the modulation rate. For example, the modulation rate and the carrier frequency may be 15 MHz and 70 MHz, respectively. Accordingly, each of the first and the second delay units 26 and 27 gives the carrier wave a phase rotation which is not equal to the integral multiple of $2\pi$ and which includes a phase displacement. In this event, the phase rotation is given by:

$$\text{and } \begin{array}{l} \omega\tau_1 = 2k\pi + \Delta\theta_{-1} \\ \omega\tau_2 = 2k\pi + \Delta\theta_{+1}, \end{array} \Big\} \quad (1)$$

where $\omega$ represents an angular frequency of the carrier wave; $\tau_1$ and $\tau_2$, the delays of the first and the second delay units 26 and 27; k, an integer; and $\Delta\theta_{-1}$ and $\Delta\theta_{+1}$, the phase displacements.

The phase rotations $\omega\tau_1$ and $\omega\tau_2$ of Equations (1) can be expressed as relative phase shifts of the first and the second additional tap signals $S_{-1}$ and $S_{+1}$ with reference to a phase of the central tap signal $S_0$, respectively, and can be rewritten into:

$$\begin{array}{l} \exp(j\omega\tau_1) = \exp(j(2k\pi + \Delta\theta_{-1})) \\ \phantom{\exp(j\omega\tau_1)} = \exp(j\Delta\theta_{-1}), \\ \text{and } \exp(j\omega\tau_2) = \exp(j(2k\pi + \Delta\theta_{+1})) \\ \phantom{\text{and } \exp(j\omega\tau_2)} = \exp(j\Delta\theta_{+1}). \end{array} \Bigg\} \quad (2)$$

It is well known in the art that, when equalization is carried out by the use of the zero forcing algorithm, the phase displacements $\Delta\theta_{-1}$ and $\Delta\theta_{+1}$ of Equations (2) should fall on a vector plane within a predetermined range given by:

$$\text{and } \begin{array}{l} -(\pi/2) < \Delta\theta_{-1} < (\pi/2) \\ -(\pi/2) < \Delta\theta_{+1} < (\pi/2). \end{array} \Big\} \quad (3)$$

Unless the phase displacements $\Delta\theta_{-1}$ and $\Delta\theta_{+1}$ satisfy the formulae (3), a variation takes place in each polarity of the real and the imaginary parts of each complex control signal. When each phase variation is adjacent to $\pm\pi/2$, stability of a control loop is seriously disturbed by the phase rotations resulting from the phase displacements. As a result, a malfunction of the equalizer is inevitable.

In order to avoid such a malfunction of the equalizer, the first through the third additional delay lines 46, 47, and 48 are connected between the first in-phase multiplier 31 and the first adder 41, between the first quadrature multiplier 32 and the second adder 42, and between the second delay unit 27 and each of the second in-phase multiplier 33 and the second quadrature multiplier 34, respectively.

At any rate, the first through the third additional delay lines 46, 47, and 48 serve to carry out operation within the predetermined range specified by the formulae (3). The equalizer is however disadvantageous as pointed out in the preamble of the instant specification.

Figure 2:
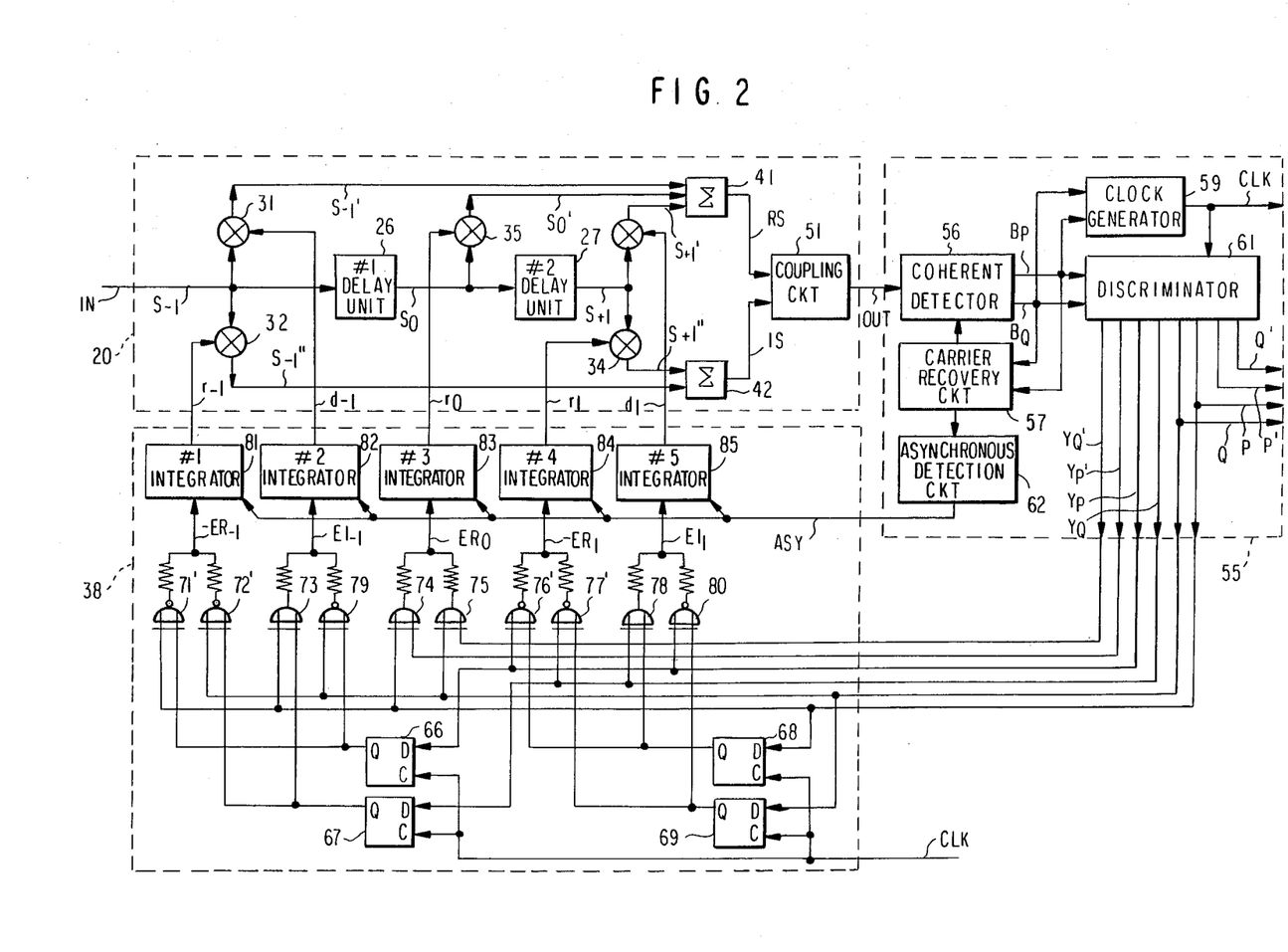
FIG. 2 shows a block diagram of an equalizer according to a first embodiment of this invention.

Referring to FIG. 2, an equalizer according to a first embodiment of this invention comprises similar parts and signals designated by like reference numerals and symbols. It is to be noted here that the illustrated equalizer is capable of carrying out operation within the predetermined range given by the formulae (3) in spite of the fact that the first through the third additional delay lines 46 to 48 are not included in the equalizer.

At first, let a principle of this invention be described with reference to FIG. 2. Each of the central tap signal $S_0$ and the first and the second additional tap signals $S_{-1}$ and $S_{+1}$ can equivalently be expressed by a baseband signal D given by:

$$D = D_P + jD_Q.$$

In addition, it is surmised that the first and the second additional tap signals $S_{-1}$ and $S_{+1}$ have the phase displacements $\Delta\theta_{-1}$ and $\Delta\theta_{+1}$ relative to the central tap signal $S_0$, respectively. Let the phase displacements $\Delta\theta_{-1}$ and $\Delta\theta_{+1}$ be greater than $\pi/2$ (rad) and smaller than $\pi$ (rad). Inasmuch as the baseband signal D is carried by the carrier wave of the angular frequency $\omega$, the central tap signal $S_0$ and the first and the second additional tap signals $S_{-1}$ and $S_{+1}$ are given by:

$$\left.\begin{array}{l} S_0 = D \cdot \exp(j\omega t), \\ S_{-1} = D \cdot \exp(j\omega t + \Delta\theta_{-1}), \\ \text{and } S_{+1} = D \cdot \exp(j\omega t + \Delta\theta_{+1}). \end{array}\right\} \quad (4)$$

Figure 3:
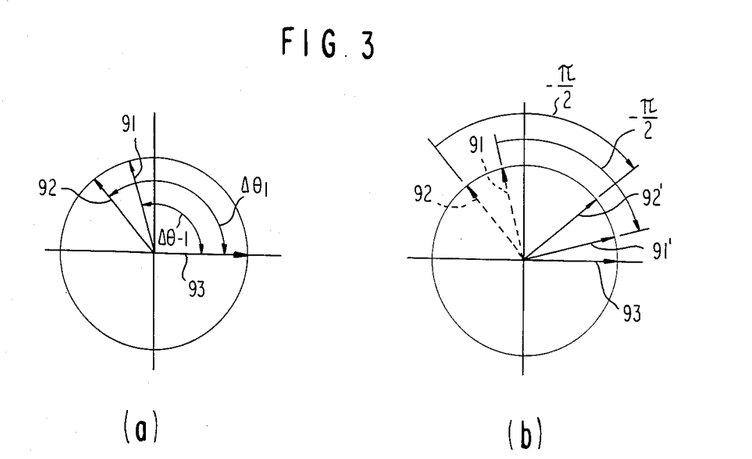
FIG. 3 show vector planes for use in describing operation of the equalizer illustrated in FIG. 2.

Temporarily referring to FIG. 3(a), the first and the second additional tap signals $S_{-1}$ and $S_{+1}$ are illustrated on a vector plane divided into the first through the fourth quadrants and represented on the vector plane by first and second vectors 91 and 92 having the phase displacements $\Delta\theta_{-1}$ and $\Delta\theta_{+1}$ relative to a specific vector 93 representative of the central tap signal $S_0$. As exemplified in FIG. 3, each of the first and the second additional tap signals $S_{-1}$ and $S_{+1}$ is present in the second quadrant. In order to carry out equalization in accordance with the zero forcing algorithm, each of the first and the second vectors 91 and 92 must be modified to be placed in either the first or the fourth quadrant.

For this purpose, the conventional equalizer illustrated in FIG. 1 delays the first controlled in-phase component $S_{-1}{}'$, the first controlled quadrature component $S_{-1}{}''$, and the second additional tap signal $S_{+1}$. This means that the carrier wave is delayed by the first through the third additional delay lines 46 to 48. A combination of the first controlled in-phase component $S_{-1}{}'$ and the first controlled quadrature component $S_{-1}{}''$ will be referred to as a first controlled complex signal $X_{-1}$ while a combination of the second controlled in-phase components $\bar{S}_{+1}{}'$ and the second controlled quadrature component $\bar{S}_{+1}{}''$, a second controlled complex signal $X_{+1}$.

On the other hand, similar operation is possible by controlling or modifying each phase of the first and the second complex control signals $C_{-1}$ and $C_{+1}$. Such modification is assumed to be made by the use of phase shift factors which are represented by $\exp(j\theta_{a(-1)})$ and $\exp(j\theta_{a(+1)})$ determined with respect to the first and the second complex control signals $C_{-1}$ and $C_{+1}$, respectively. In the phase shift factors, each of $\theta_{a(-1)}$ and $\theta_{a(+1)}$ will be referred to as a phase factor. Under the circumstances, the first and the second controlled complex signals $X_{-1}$ and $X_{+1}$ are represented by:

$$\left.\begin{array}{l} X_{-1} = D \cdot C_{-1} \cdot \exp(j(\omega t + \Delta\theta_{-1})) \cdot \exp(j\theta_{a(-1)}) \\ \quad = D \cdot (r_{-1} + jd_{-1}) \cdot \exp(j(\omega t + \Delta\theta_{-1})) \cdot \exp(j\theta_{a(-1)}) \\ \quad = D \cdot r_{-1} \cdot \exp(j(\omega t + \Delta\theta_{-1})) \cdot \exp(j\theta_{a(-1)}) \\ \qquad + jD \cdot d_{-1} \cdot \exp(j(\omega t + \Delta\theta_{-1})) \cdot \exp(j\theta_{a(-1)}) \\ \text{and } X_{+1} = D \cdot C_1 \cdot \exp(j(\omega t + \Delta\theta_{+1})) \\ \quad = D \cdot (r_1 + jd_1) \cdot \exp(j(\omega t + \Delta\theta_{+1})) \cdot \exp(j\theta_{a(+1)}) \\ \quad = D \cdot r_1 \cdot \exp(j(\omega t + \Delta\theta_{+1})) \cdot \exp(j\theta_{a(+1)}). \end{array}\right\} \quad (5)$$

From Equations (5), it is readily understood that the use of the phase shift factors is equivalent to the use of the additional delay lines 46 to 48 illustrated in FIG. 1.

When both of the phase factors $\theta_{a(-1)}$ and $\theta_{a(+1)}$ are equal to $-(\pi/2)$, Equations (5) are rewritten into:

$$\left.\begin{array}{l} X_{-1} = D \cdot (r_{-1} + jd_{-1}) \cdot \exp(j(\omega t + \Delta\theta_{-1})) \cdot (-j) \\ \quad = D \cdot d_{-1} \cdot \exp(j(\omega t + \Delta\theta_{-1})) - \\ \qquad jD \cdot r_{-1} \cdot \exp(j(\omega t + \Delta\theta_{-1})) \text{ and} \\ X_{+1} = D \cdot (r_1 + jd_1) \cdot \exp(j(\omega t + \Delta\theta_{+1})) \cdot (-j) \\ \quad = D \cdot d_1 \cdot \exp(j(\omega t + \Delta\theta_{+1})) - \\ \qquad jD \cdot r_1 \cdot \exp(j(\omega t + \Delta\theta_{+1})). \end{array}\right\} \quad (6)$$

Referring to FIG. 3(b), Equations (6) show that the first and the second vectors 91 and 92 are rotated clockwise by $(\pi/2)$ into first and second modified vectors 91' and 92' which are placed in the first quadrant.

It is seen from Equations (6) that the real and the imaginary parts r and d (subscripts omitted) of each complex control signal C may be delivered to the quadrature and the in-phase multipliers, respectively, and that a polarity of each real part of the complex control signals may be inverted, if the first and the second vectors 91 and 92 are present in the second quadrant.

Such delivery of each complex control signal and polarity inversion make superfluous additional delay lines unnecessary. This means that the equalizer becomes simple in structure when each of the phase factors $\theta_{a(-1)}$ and $\theta_{a(-1)}$ is equal to $-(\pi/2)$ (rad).

Even when each phase factor $\theta_{a(-1)}$ and $\theta_{a(+1)}$ is equal to an integral multiple of $(\pi/2)$, the additional delay lines 46 to 48 become unnecessary, as will become clear. In other words, each phase factor $\theta_{a(-1)}$ and $\theta_{a(+1)}$ may have a step equal to the integral multiple of $(\pi/2)$, although the description is mainly directed to the case where each phase factor $\theta_{a(-1)}$ and $\theta_{a(+1)}$ takes $-(\pi/2)$.

Referring back to FIG. 2, the first and the second complex control signals $C_{-1}$ and $C_{+1}$ are delivered from the control signal generating circuit 38 to the transversal filter 20 in consideration of each phase factor $\theta_{a(-1)}$ and $\theta_{a(+1)}$ of $\pi/2$. More particularly, the real part $r_{-1}$ of the first complex control signal $C_{-1}$ is subjected to phase inversion to be delivered to the first quadrature multiplier 32 in the form of $-r_{-1}$. The imaginary part $d_{-1}$ of the first complex control signal $C_{-1}$ is delivered to the in-phase multiplier 31 as it stands. Similarly, the real and the imaginary parts $r_1$ and $d_1$ of the second complex control signal $C_{+1}$ are delivered to the second quadrature and the second in-phase multipliers 34 and 33 in the form of $-r_1 d_1$, respectively.

Each combination of the inverted real part and the imaginary part of each complex control signal may be called a modified control signal or a modified complex signal.

Thus, the first and the second in-phase multipliers 31 and 33 supply the first adder 41 with the real parts of $X_{-1}$ and $X_{+1}$ shown in Equations (6) as the first and the second in-phase components $S_{-1}'$ and $S_1'$, respectively, while the first and the second quadrature multipliers 32 and 34 supply the second adder 42 with the imaginary parts of $X_{-1}$ and $X_{+1}$ as the first and the second quadrature components $S_{-1}''$ and $S_1''$, respectively.

From this fact, it is obvious that the step of $-(\pi/2)$ determines the polarity of each real part r of the first and the second complex control signals $C_{-1}$ and $C_{+1}$ together with delivery of each modified control signal to the multipliers.

In order to produce the above-mentioned modified control signals, the control signal generating circuit 38 illustrated in FIG. 2 is somewhat changed from that illustrated in FIG. 1, with the first through the fourth flip flops 66 to 69 unchanged. Specifically, the illustrated control signal generating circuit 38 comprises Exclusive NOR gates 71', 72', 76', and 77' substituted for the first, the second, the sixth, and the seventh Exclusive OR gates 71, 72, 76, and 77 shown in FIG. 1, respectively. The Exclusive NOR gate pair 71' and 72' serves to produce a first intermediate control signal $-ER_{-1}$ which is inverted relative to that illustrated in FIG. 1 and which is delivered as the real part $(-r_{-1})$ of a first one of the modified control signals to the first quadrature multiplier 32 through the first resettable integrator 81. Likewise, the Exclusive NOR gate pair 76' and 77' is operable to produce fourth intermediate control signal $-ER_1$ which is sent to the second quadrature multiplier 34 through the fourth resettable integrator 84 as the real part $(-r_1)$ of a second one of the modified control signals. Thus, both of the Exclusive NOR gate pairs 71' and 72'; 76' and 77' are operated to substitute the modified control signals for the first and the second complex control signals $C_{-1}$ and $C_{+1}$ and may therefore be called a substituting circuit or a first circuit.

The remaining parts of the control signal generating circuit 38 are similar to those illustrated in FIG. 1. Therefore, the second, the third, and the fifth intermediate control signals $EI_{-1}$, $ER_0$, and $EI_1$ are produced in the manner described in conjunction with FIG. 1.

As mentioned above, the first in-phase and the first quadrature multipliers 31 and 32 and the second in-phase and the second quadrature multipliers 33 and 34 carry out calculation in accordance with Equations (6). For this purpose, each real part of the modified control signals is delivered to each quadrature multiplier 32 and 34 while each imaginary part of the modified control signals is delivered to each in-phase multiplier 31 and 33. As a result, connections between the multipliers 31 to 34 and the corresponding integrators serve as a delivery circuit or a second circuit for delivering the modified control signals to the multipliers 31 to 34. The first in-phase and the first quadrature multipliers 31 and 32 produce the first controlled in-phase component $S_{-1}'$ and the first controlled quadrature component $S_{-1}''$ represented by:

$$S_{-1}' = D \cdot d_{-1} \cdot exp(j(\omega t + \Delta\theta_{-1}))$$

and $$S_{-1}' = -D \cdot r_{-1} \cdot exp(j(\omega t + \Delta\theta_{-1})),$$

respectively.

Likewise, the second in-phase and the second quadrature multipliers 33 and 34 produce the second controlled in-phase component $S_1'$ and the second controlled quadrature component $S_1''$ represented by:

$$S_{+1}' = D \cdot d_1 \cdot exp(j(\omega t + \Delta\theta_{+1}))$$

and $$S_{+1}'' = -D \cdot r_1 \cdot exp(j(\omega t + \Delta\theta_{+1})).$$

The first adder 41 sums up the first and the second controlled in-phase components $S_{-1}'$ and $S_{+1}'$ and the central controlled signal $S_0$ to produce the in-phase signal RS. The second adder 42 sums up the first and the second controlled quadrature signals $S_{-1}''$ and $S_{+1}''$ to produce the quadrature signal IS. The in-phase and the quadrature signals RS and IS are combined together by the coupling circuit 51 in the manner described with reference to FIG. 1 and demodulated by the demodulator 55. Operation of the demodulator 55 is similar to that illustrated in FIG. 1 and will therefore not be described any longer.

Thus, correct equalization of the input signal IN is carried out without any superfluous elements, such as the additional delay lines 46 to 48 illustrated in FIG. 1 even when the first and the second vectors 91 and 92 are present in the second quadrant.

Figure 4:
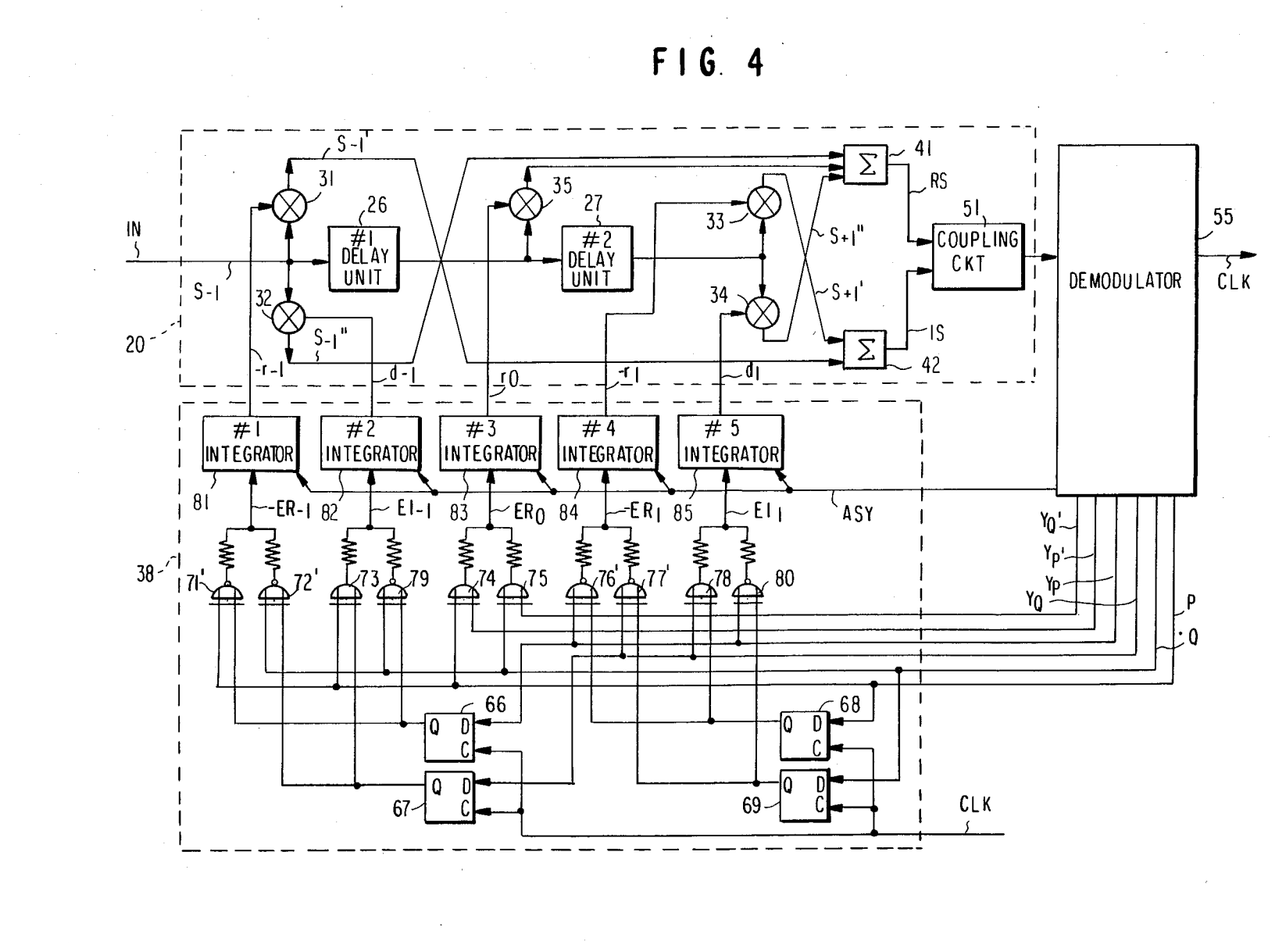
FIG. 4 shows a block diagram of an equalizer according to a second embodiment of this invention.

Referring to FIG. 4, an equalizer according to a second embodiment of this invention is similar to that illustrated in FIG. 2 except that the real parts $-r_{-1}$ and $r_1$ and the imaginary parts $d_{-1}$ and $d_1$ of the modified control signals are delivered to the in-phase multipliers 31 and 33 and to the quadrature multipliers 32 and 34, respectively, and that the first adder 41 is connected to the quadrature multipliers 32 and 34 while the second adder 42 is connected to the in-phase multipliers 31 and 33.

Thus, connections between the multipliers and the adders are interchanged with those illustrated in FIG. 2, with the real and the imaginary parts of each modified control signal delivered to the in-phase and the quadrature multipliers, respectively. Such connections and delivery are determined by the step of $-(\pi/2)$. In other words, the step determines the delivery of each modified control signal to the multipliers and the connections between the multipliers and the adders.

The remaining parts are similar to those illustrated in FIG. 2. With this structure, it is possible to carry out operation similar to the equalizer illustrated in FIG. 2.

Figure 5:
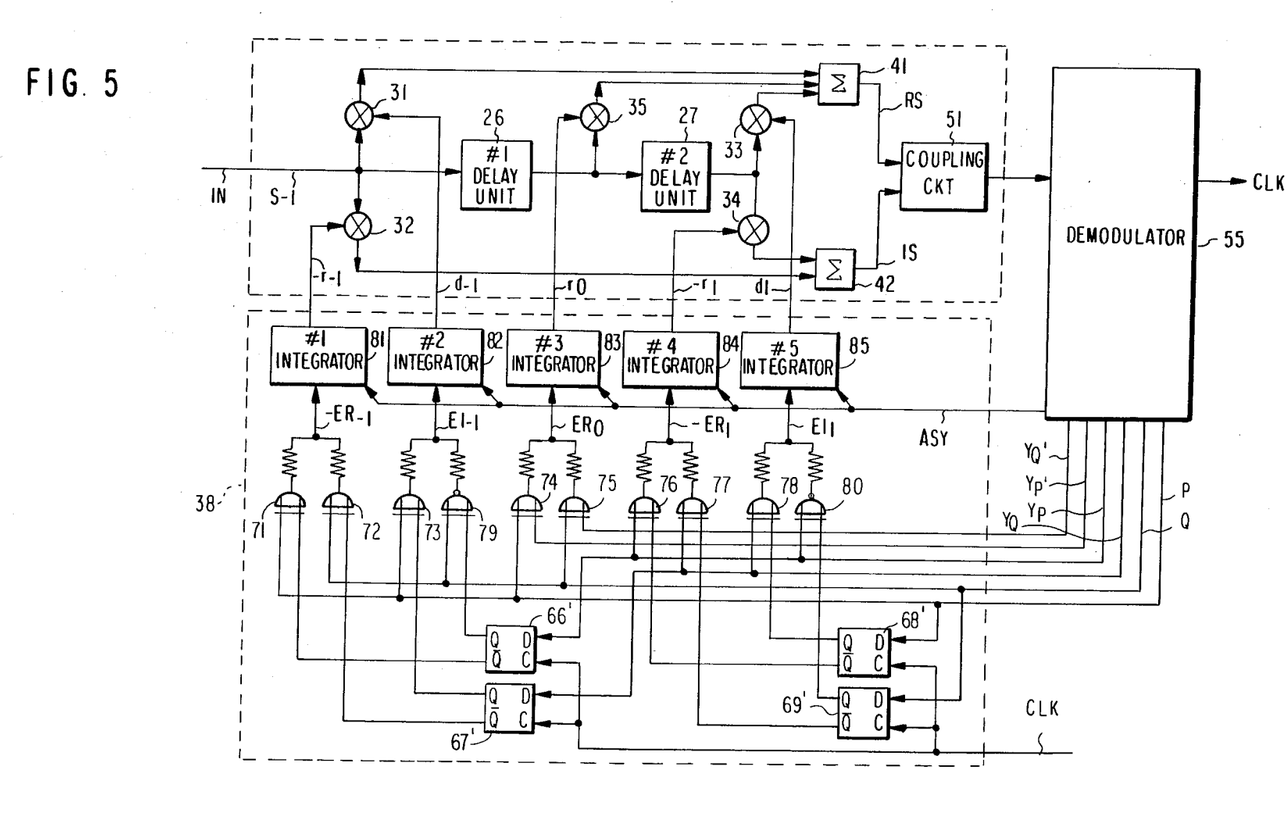
FIG. 5 shows a block diagram of an equalizer according to a third embodiment of this invention.

Referring to FIG. 5, an equalizer according to a third embodiment of this invention comprises similar parts designated by like reference numerals. In the illustrated control signal generating circuit 38, the first and the second modified control signals described in conjunction with FIGS. 2 and 4 are produced by the use of first through fourth flip flops 66' to 69' each of which has a positive terminal Q and a negative terminal $\overline{Q}$. An arrangement of the Exclusive logic circuits 71 to 80 is unchanged from that illustrated in FIG. 1 and is capable of carrying out a predetermined logic operation in a manner similar to that of FIG. 1. Instead, the negative terminal $\overline{Q}$ of the first flip flop 66' is connected to the first Exclusive OR gate 71 while the negative terminal $\overline{Q}$ of the second flip flop 67' is connected to the second Exclusive OR gate 72. Likewise, the negative terminals $\overline{Q}$ of the third and the fourth flip flops 68' and 69' are connected to the sixth and the seventh Exclusive OR gates 76 and 77, respectively.

With this structure, it is possible to produce first and fourth modified intermediate control signals $-ER_{-1}$ and $-ER_1$ having phases inverted relative to the first and the fourth intermediate control signals $ER_{-1}$ and $ER_1$ illustrated in FIG. 1, as readily understood from FIG. 5. Thus, the flip flops are operable to make the Exclusive logic circuits 71 to 73, 76 to 78, 79 and 80 produce the modified control signals.

Thus, the first, the second, the sixth, and the seventh Exclusive OR gates 71, 72, 76, and 77 may not be changed to Exclusive NOR gates in the illustrated control signal generating circuit 38. In addition, the illustrated transversal filter 20 is similar in structure to that of FIG. 2.

It is needless to say that inverters may be connected between the positive terminals of the flip flops 66' to 69' and the Exclusive OR gates 71, 72, 76, and 77, respectively, in lieu of use of the negative terminals $\overline{Q}$ of the respective flip flops.

Figure 6:
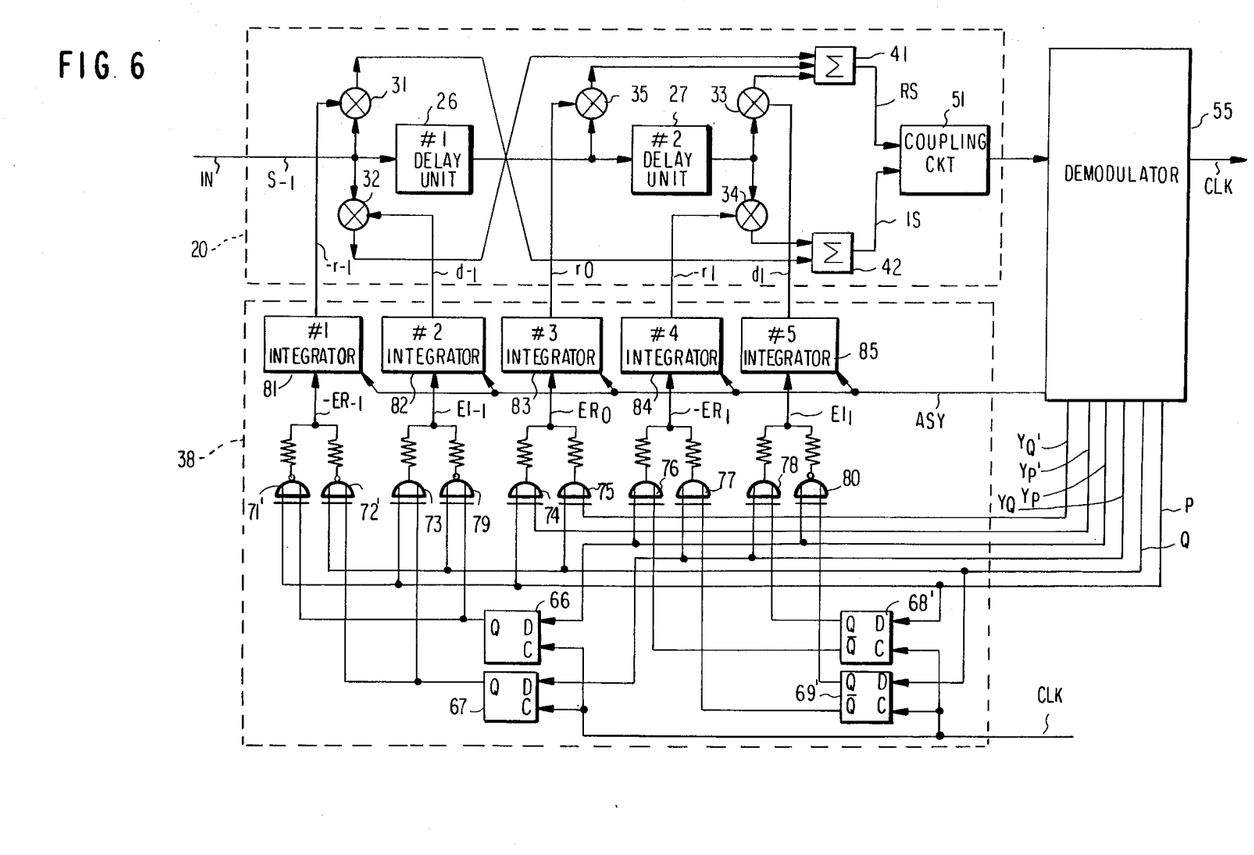
FIG. 6 shows a block diagram of an equalizer according to a fourth embodiment of this invention.

Referring to FIG. 6, an equalizer according to a fourth embodiment of this invention comprises similar parts and signals designated by like reference numerals and symbols. The illustrated control signal generating circuit 38 produces the real part $-r_{-1}$ of the first modified control signal by the use of the Exclusive NOR gates 71' and 72' connected to the positive terminals Q of the first and the second flip flops 66 and 67, as is the case with FIG. 2. The real and the imaginary parts $-r_{-1}$ and $d_{-1}$ are delivered to the first in-phase and the first quadrature multipliers 31 and 32 interconnected to the second and the first adders 41 and 42, respectively, like in FIG. 4.

Furthermore, the real part $-r_1$ of the second modified control signal is produced through the sixth and the seventh Exclusive OR gates 76 and 77 connected to the negative terminals $\overline{Q}$ of the third and the fourth flip flops 68' and 69', respectively, in the manner described in conjunction with FIG. 5. In addition, the real and the imaginary parts $-r_1$ and $d_1$ are delivered to the second quadrature and the second in-phase multipliers 33 and 34 connected to the first and the second adders 41 and 42, respectively, like in FIG. 2.

Thus, the illustrated equalizer uses three methods described in FIGS. 2, 4, and 5, so as to determine the polarity of each real part of the modified control signals, the delivery of each modified control signal to the multipliers, and the delivery of each controlled component to the adders.

Figure 7:
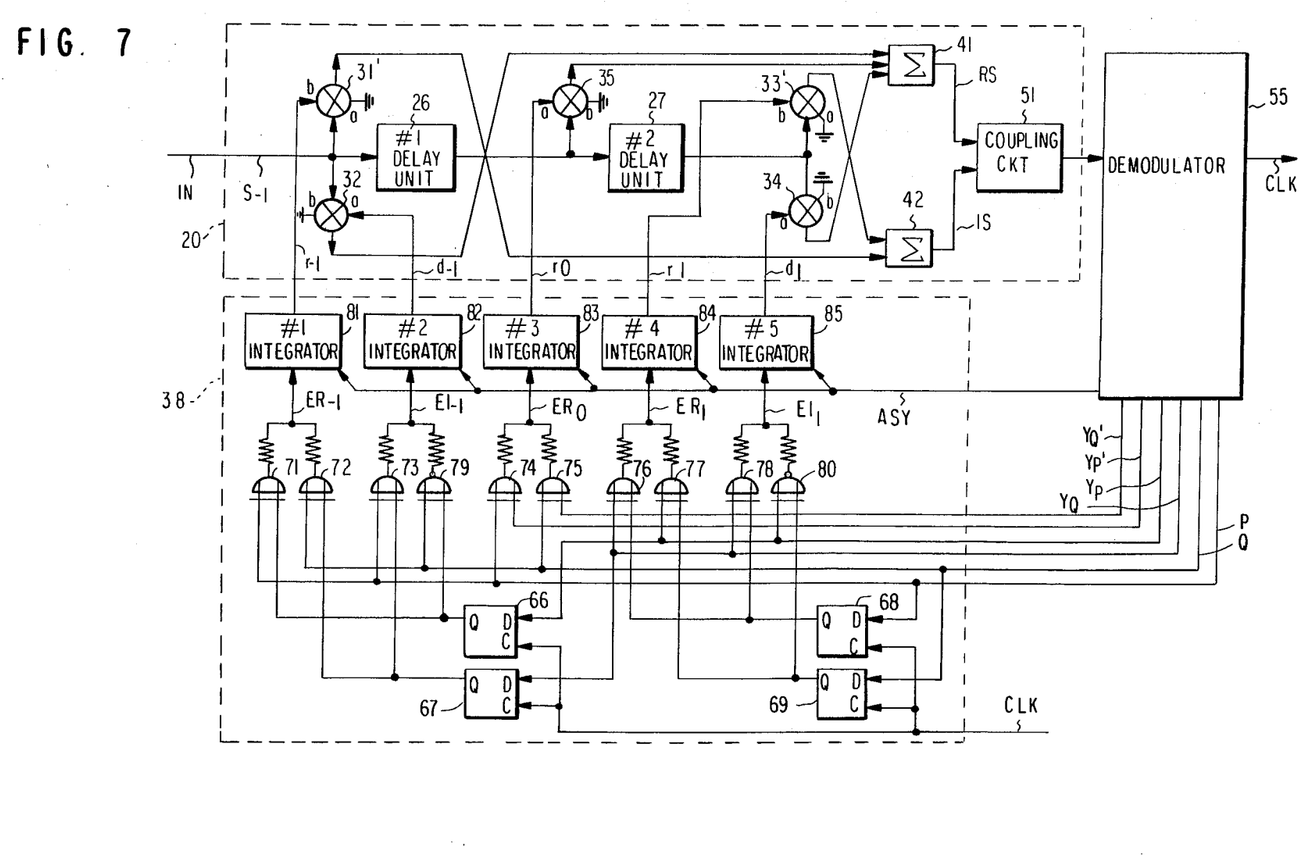
FIG. 7 shows a block diagram of an equalizer according to a fifth embodiment of this invention.

Referring to FIG. 7, an equalizer according to a fifth embodiment of this invention comprises similar parts designated by like reference numerals and symbols. It is to be noted here that the real and the imaginary parts r and d of each of the first and the second control signals $C_{-1}$ and $C_{+1}$ are supplied from the control signal generating circuit to the transversal filter 20 without being modified, like in FIG. 1. First in-phase and first quadrature multipliers 31' and 32' and second in-phase and second quadrature multipliers 33' and 34' are modified from those illustrated in the other figures, so as to invert the real and the imaginary parts of the respective control signals.

Figure 8:
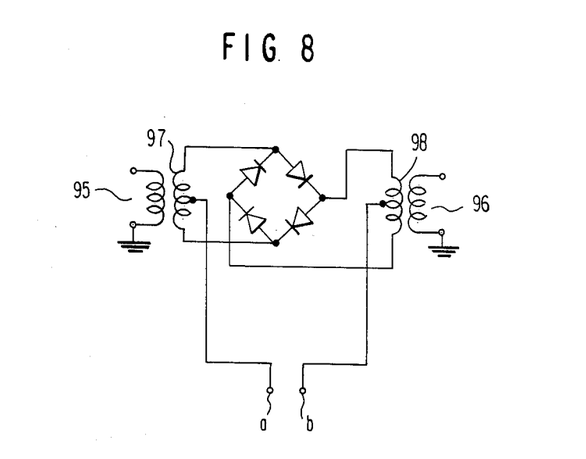
FIG. 8 shows a circuit diagram of a multiplier illustrated in FIG. 7.

Referring to FIG. 8 for a while, each multiplier which is used in FIG. 8 is similar in structure to a ring modulator of a balanced type having input and output terminals 95 and 96 and first and second additional terminals a and b connected to center terminals of transformers 97 and 98, respectively.

In general, the first additional terminal a is supplied with a control signal while the second additional terminal b is grounded. Under the circumstances, let the control signal have a predetermined phase. The predetermined phase of the control signal is changed to an inverted phase when the second additional terminal b is supplied with the control signal with the first additional terminal a grounded. Thus, it is possible for the illustrated multiplier to invert a phase of a control signal given between the first and the second additional terminals a and b.

Referring back to FIG. 7, each of the first in-phase and the second in-phase multipliers 31' and 33' has a first additional terminal a grounded and a second additional terminal b supplied with each real part r of the first and the second control signals $C_{-1}$ and $C_{+1}$. As a result, each real part of the first and the second control signals $C_{-1}$ and $C_{+1}$ is modified into an inverted real part in each of the first and the second in-phase multipliers 31' and 33'.

On the other hand, each of the first and the second quadrature multipliers 32 and 34 has a first additional terminal a supplied with each imaginary part and a second additional terminal b grounded. Accordingly, each imaginary part of the first and the second control signals $C_{-1}$ and $C_{+1}$ is not subjected to phase inversion.

Anyway, the first and the second control signals $C_{-1}$ and $C_{+1}$ are modified into the first and the second modified signals in the multipliers.

As is the case with FIG. 4, the first and the second in-phase multipliers 31' and 33' are connected to the second adder 42 while the first and the second quadrature multipliers 32 and 34 are connected to the first adder 41.

Although each step of the phase factors $\theta_{a(+1)}$ and $\theta_{a(-1)}$ is equal to $-(\pi/2)$ in the above-mentioned embodiments, the additional delay lines 46 to 48 illustrated in FIG. 1 can be omitted from an equalizer if the steps are equal to an integral multiple of $\pi/2$. Specifically, when each of the phase factors $\theta_{a(-1)}$ and $\theta_{a(+1)}$ is $\pi/2$, the first and the second controlled complex signals $X_{-1}$ and $X_{+1}$ are given by:

$$\left.\begin{aligned} X_{-1} &= D \cdot (r_{-1} + jd_{-1}) \cdot \exp(j(\omega t + \Delta\theta_{-1})) \cdot (j) \\ &= -D \cdot d_{-1} \cdot \exp(j(\omega t + \Delta\theta_{-1})) + \\ &\quad jD \cdot r_{-1} \cdot \exp(j(\omega t + \Delta\theta_{-1})) \text{ and} \\ X_{+1} &= D \cdot (r_1 + jd_1) \cdot \exp(j(\omega t + \Delta\theta_{+1})) \cdot (j) \\ &= -D \cdot d_1 \cdot \exp(j(\omega t + \Delta\theta_{+1})) + \\ &\quad jD \cdot r_1 \cdot \exp(j(\omega t + \Delta\theta_{+1})). \end{aligned}\right\} \quad (7)$$

If each of the phase factors $\theta_{a(-1)}$ and $\theta_{a(+1)}$ is equal to $\pi$, the first and the second controlled complex signals $X_{-1}$ and $X_{+1}$ are given by:

$$\left.\begin{aligned} X_{-1} &= D \cdot (r_{-1} + jd_{-1}) \cdot \exp(j(\omega t + \Delta\theta_{-1})) \cdot (-1) \\ &= -D \cdot r_{-1} \cdot \exp(j(\omega t + \Delta\theta_{-1})) - \\ &\quad jD \cdot d_{-1} \cdot \exp(j(\omega t + \Delta\theta_{-1})) \text{ and} \\ X_{+1} &= D \cdot (r_1 + jd_1) \cdot \exp(j(\omega t + \Delta\theta_{+1})) \cdot (-1) \\ &= -D \cdot r_1 \cdot \exp(j(\omega t + \Delta\theta_{+1})) - \\ &\quad jD \cdot d_1 \cdot \exp(j(\omega t + \Delta\theta_{+1})). \end{aligned}\right\} \quad (8)$$

Equations (7) can readily be accomplished by inverting each imaginary part of the first and the second complex control signals $C_{-1}$ and $C_{+1}$ and by interchanging delivery of the real and the imaginary parts of each complex control signal to the multipliers in a manner illustrated in FIG. 2 or FIGS. 4 through 7. Likewise, Equations (8) show that the real and the imaginary parts of the first and the second complex control signals may be inverted.

Thus, equalization can be carried out by the use of the zero forcing algorithm, if the phase factors $\theta_{a(-1)}$ and $\theta_{a(+1)}$ are selected in consideration of the phase displacements $\Delta\theta_{-1}$ and $\Delta\theta_{+1}$ and the formulae (3). This means that the first and the second vectors 91 and 92 of the first and the second additional tap signals may be either in the second or in the third quadrant of the vector plane shown in FIG. 2.

Combinations of the phase factors $\theta_{a(-1)}$ and $\theta_{a(+1)}$ can be enumerated in relation to positions of the first and the second vectors as follows:

$$
\begin{aligned}
(\theta_{a(-1)}, \theta_{a(+1)}) = &(-\pi/2, -\pi/2), \\
&(-\pi/2, \pi/2), \\
&(\pi/2, -\pi/2), \\
&(\pi/2, \pi/2), \\
&(\pi, -\pi/2), \\
&(\pi, \pi/2), \\
&(-\pi/2, \pi), \\
&(\pi/2, \pi), \\
&(\pi, \pi), \\
&(0, -\pi/2), \\
&(0, \pi/2), \\
&(0, \pi), \\
&(-\pi/2, 0), \\
&(\pi/2, 0), \\
&(\pi, 0).
\end{aligned}
$$

and

In any event, this invention enables application of the zero forcing algorithm by controlling a phase of each complex control signal. The equalizer according to this invention is econmical and can readily cope with a change of a carrier wave frequency.

While this invention has thus far been described in conjunction with several embodiments thereof, it will readily be possible for those skilled in the art to put this invention into practice in various other manners. For example, the transversal filter 20 may have $(2N+1)$ taps where N represents an integer more than unity. All of the complex control signals may not always be modified. In other words, a specific one of the complex control signals alone may be controlled to satisfy the formulae (3). In addition, the equalizer may be either of a self-adaptive type or a preset type.

What is claimed is:

1. An equalizer responsive to an input signal subjected to modulation at a modulation rate for producing an output signal, said input signal being accompanied by a carrier wave of a carrier frequency, said equalizer including delay means responsive to said input signal for successively delaying said input signal in relation to said modulation rate to produce a central tap signal and additional tap signals, control signal generating means for generating a central control signal and complex control signals which are in one-to-one correspondence to said central and said additional tap signals, respectively, and output signal producing means responsive to said central and said additional tap signals and to said central control signal for producing said output signal, said complex control signals having difference phases relative to said central control signal, wherein the improvement comprises:

phase modifying means for modifying a specific phase of one of said complex control signals into a modified phase by shifting said specific phase by a step determined in relation to said modulation rate and said carrier frequency.

2. An equalizer as claimed in claim 1, wherein said modified phase is placed in a predetermined range relative to said central control signal.

3. An equalizer as claimed in claim 2, said predetermined range being greater than minus $\pi/2$ (rad) and smaller than $\pi/2$, (rad) wherein said phase modifying means modifies said specific phase by said step equal to an integral multiple of $\pi/2$ (rad).

4. An equalizer as claimed in claim 3, wherein said modified phase is specified by a modified complex signal dependent on said step.

5. An equalizer as claimed in claim 4, one of said additional top signals comprising an in-phase and a quadrature component and corresponding to said one complex control signal, said output signal producing means comprising a specific in-phase control circuit for controlling the in-phase component of said one additional tap signal to produce a first controlled signal, a specific quadrature control circuit for controlling the quadrature component of said one additional tap signal to produce a second controlled signal, and means responsive to said first and said second controlled signals and to said central and the remaining additional tap signal to produce said output signal, wherein:

said phase modifying means comprises:

signal delivering means responsive to said one of the complex control signals for delivering the real and the imaginary parts of said modified complex signal to said specific in-phase and said specific quadrature control circuits, with each polarity of the real and the imaginary parts to said modified complex signal determined by said step.

6. An equalizer as claimed in claim 5, wherein:

said signal delivering means comprises:

first means included in said control signal generating means for substituting said modified complex signal for said one complex control signal, the real and the imaginary parts of said modified complex signal having the polarity determined by said step; and second means for delivering the real and the imaginary parts of said modified complex signal to said specific in-phase and said specific quadrature control circuits in consideration of said step.

7. An equalizer as claimed in claim 6, said control signal generating means comprising a flip flop circuit for producing a set of logic signals which is for said one complex control signal, wherein said first means comprises:

a logic circuit responsive to said logic signal set and included in said control signal generating means for producing said modified complex signal with reference to said step to determine each polarity of the real and the imaginary parts of said modified complex signal.

8. An equalizer as claimed in claim 6, wherein:

said step is equal to minus $\pi/2$ (rad);

said first means comprising:

inverting means for phase inverting the real part of said modified complex signal relative to the real part of said one complex control signal, with the imaginary part of said modified complex signal kept in-phase relative to the imaginary part of said one complex control signal;

said second means comprising:

means for delivering the real part of said modified complex signal to said specific quadrature control circuit; and means for delivering the imaginary part of said modified complex signal to said specific in-phase control circuit.

9. An equalizer as claimed in claim 6, said control signal generating means comprising a predetermined logic circuit for carrying out a predetermined logic operation to produce said one complex control signal when supplied with a predetermined logic signal, wherein said first means comprises:

a flip flop circuit included in said control signal generating means for modifying said predetermined logic signal to make said predetermined logic circuit produce said modified complex signal.

10. An equalizer as claimed in claim 4, each of said additional tap signals comprising an in-phase and a quadrature component, a specific one of said additional tap signals corresponding to said one complex control signal, said output signal producing means comprising a specific in-phase control circuit for controlling the in-phase component of said specific additional tap signal to produce a first controlled signal, a specific quadrature control circuit for controlling the quadrature component of said specific additional tap signal to produce a second controlled signal, first processing means for processing said central tap signal and each in-phase component of said additional tap signals to produce a first processed signal, second processing means for processing each quadrature component of said additional tap signals to produce a second processed signal, and means responsive to said first and said second processed signals for producing said output signal, wherein:

said phase modifying means comprises:

signal supplying means for supplying said specific in-phase and said specific quadrature control circuits with the real and the imaginary parts of said modified complex signal which have polarities determined by said step; and signal delivering means for delivering said first and said second controlled signals to said first and said second processing means determined by said step.

11. An equalizer as claimed in claim 10, wherein:

said signal supplying means comprises:

means for delivering the real and the imaginary parts of said modified complex signal to said specific in-phase and said specific quadrature control circuits, respectively;

said signal delivering means comprising:

connecting means for connecting said specific in-phase and said specific quadrature control circuits to said first and said second processin means in consideration of said step.

12. An equalizer as claimed in claim 11, said control signal generating means comprising a flip flop circuit for producing a preselected set of logic signals which is for said one complex control signal, wherein said phase modifying means comprises:

a logic circuit responsive to said preselected logic signal set for producing said modified complex signal with reference to said step to determine each polarity of the real and the imaginary parts of said modified complex signal.

13. An equalizer as claimed in claim 11, said control signal generating means comprising a predetermined logic circuit for carrying out a predetermined logic operation to produce said one complex control signal when supplied with a predetermined logic signal, wherein said phase modifying means comprises:

a flip flop circuit for modifying said predetermined logic signal to make said predetermined logic circuit produce said modified complex signal.

14. An equalizer as claimed in claim 10, wherein:

said phase modifying means further comprises:

means for delivering the real and the imaginary parts of said modifed complex signal to said specific in-phase and said specific quadrature control circuits determined by said step.

15. An equalizer as claimed in claim 10, wherein said phase modifying means comprises:

first means included in said control signal generating means for substituting said modified complex signal for said one complex control signal, the real and the imaginary parts of said modified complex signal having the polarity determined by said step;

second means for delivering the real and the imaginary parts of said modified complex signal to said specific in-phase and said specific quadrature control circuits in consideration of said step; and third means for connecting said specific in-phase and said specific quadrature control circuits to said first and said second processing means in consideration of said step.

16. An equalizer as claimed in claim 10, wherein said phase modifying means comprises phase inversion means included in at least one of said specific in-phase and said specific quadrature control circuits and responsive to said one complex control signal for inverting at least one of the real and the imaginary parts of said one complex control signal into said modified control signal.

* * * * *

UNITED STATES PATENT AND TRADEMARK OFFICE
CERTIFICATE OF CORRECTION

PATENT NO. : 4,627,072
DATED : December 2, 1986
INVENTOR(S) : Toshihiko RYU et al It is certified that error appears in the above-identified patent and that said Letters Patent is hereby corrected as shown below:

Column 3, line 43, Delete "$r_{31\ 1}$" and insert --$r_{-1}$--;

Column 3, line 67, Reads "$\bar{S}_{+1}$' and $\bar{S}+1$"," should read --$\bar{S}_{+1}$' and $\bar{S}_{+1}$",--;

Column 6, line 31, Delete "$\Delta\Theta_{31\ 1}$" and insert --$\Delta\Theta_{-1}$--;

Column 7, line 61, Delete "$\bar{S}+1$," and insert --$\bar{S}_{+1}$'--;

Column 8, line 45, Reads "$\Theta_{a(-1)}$ and $\Theta_{a(-1)}$" should read --$\Theta_{a(-1)}$ and $\Theta_{a(+1)}$--;

Column 8, line 68, Delete "-$r_1 d_1$," and insert -- -$r_1$ and $d_1$,--;

Column 10, line 2, Delete "$S_{-1}$'" and insert --$S_{-1}$"--;

Column 10, line 21, Reads "$S_{-1}$" and $S_{+1}$'" should read --$S_{-1}$" and $S_{+1}$"--;

Column 11, line 64, Delete "32'" and insert --32--;

Column 11, line 65, Delete "34'" and insert --34--;

Column 16, line 4, Delete "processin" and insert --processing--.

UNITED STATES PATENT AND TRADEMARK OFFICE
CERTIFICATE OF CORRECTION

PATENT NO.   : 4,627,072

DATED        : December 2, 1986

INVENTOR(S)  : Toshihiko Ryu et al.

It is certified that error appears in the above-identified patent and that said Letters Patent is hereby corrected as shown below:

Column 16, line 4, delete "processin" and insert -- processing --.

Signed and Sealed this

Twenty-ninth Day of September, 1987

*Attest:*

DONALD J. QUIGG

*Attesting Officer*    *Commissioner of Patents and Trademarks*